United States Patent [19]

Sahajpal et al.

[11] 4,299,885

[45] Nov. 10, 1981

[54] ENCAPSULATED PHOSPHITES

[75] Inventors: Ved K. Sahajpal, Oudorp, Netherlands; Jacques Delaere, Merelbeke, Belgium; Zigmunt K. Kromolicki, Lisse; Mattheus R. Settels, Amsterdam, both of Netherlands

[73] Assignee: Borg-Warner Chemicals, Inc., Parkersburg, W. Va.

[21] Appl. No.: 69,423

[22] Filed: Aug. 24, 1979

Related U.S. Application Data

[63] Continuation of Ser. No. 863,823, Dec. 23, 1977, abandoned.

[51] Int. Cl.$^3$ ............................ B05D 7/00; B32B 5/16
[52] U.S. Cl. ..................................... 428/403; 427/212; 427/220; 260/42.14; 106/308 Q

[58] Field of Search ................. 423/268, 274; 427/212, 427/220; 428/403; 260/42.14; 106/308 Q

[56] References Cited

U.S. PATENT DOCUMENTS 1,692,996  11/1928  Richardson ........................ 427/220

*Primary Examiner*—Sam Silverberg
*Attorney, Agent, or Firm*—Joseph Shekleton

[57] ABSTRACT

An improved polymer additive characterized by excellent stability to hydrolysis. Dialkyl pentaerythritol diphosphites are encapsulated in a petroleum or ester wax and thereby rendered relatively immune to decomposition under ordinary conditions of storage. At the same time, the wax coating is sufficiently low melting as to present no problem during milling operations at elevated temperatures, for example, where the heat stabilizing qualities of the dialkyl pentaerythritol diphosphite are required.

9 Claims, No Drawings

ENCAPSULATED PHOSPHITES

This is a continuation of application Ser. No. 863,823 filed Dec. 23, 1977 now abandoned.

This invention relates to polymer additives and, in particular, to certain organic phosphites which are effective to impart stability at elevated temperatures to such polymers as polyolefins, vinyl chloride polymers, ABS and the like.

BACKGROUND OF THE INVENTION

The normal processing operations to which thermoplastic polymers are subjected invariably involves high temperatures and these promote the deterioration of the polymers. The formulation of a polymer composition, i.e., one which contains the various stabilizing additives ordinarily required, usually is accomplished on a heated two-roll mill, or in a heated Banbury mixer, or both, and the temperatures at which such mixing steps are carried out are quite high, well above the temperature at which the polymer becomes fluid. At these temperatures the polymer will develop color, become brittle, etc., and such evidence of deterioration cannot be tolerated in the final product.

There are a number of heat stabilizing additives available which are effective to protect thermoplastic polymers from such deterioration. Among these are the organic phosphites. The dialkyl pentaerythritol diphosphites are especially effective for this purpose and are widely used. They are prepared by the reaction of two mols of an alcohol with diphenyl (or dichloro) pentaerythritol diphosphite. The reaction is illustrated by the equation:

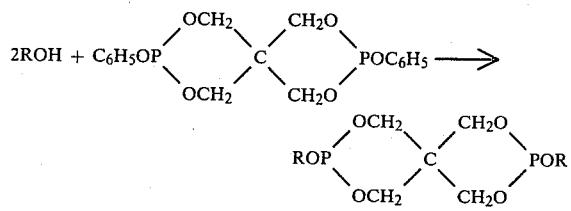

The product shown above is the spiro isomer, and where diphenyl pentaerythritol diphosphite is the reactant, as above, this spiro isomer comprises about half of the combined total of spiro and caged isomers. The caged isomer has the structure:

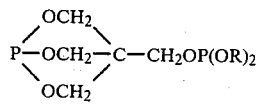

When dichloro pentaerythritol diphosphite is substituted for the diphenyl compound as the reactant, however, the product which results is relatively pure spiro isomer. Inasmuch as the spiro isomer is itself more stable to hydrolysis, it is a preferred form.

Phosphite esters generally, however, are prone to hydrolysis, and their hydrolysis is accompanied by a corresponding loss of heat stabilizing effectiveness with respect to the polymer compositions in which they are used for that purpose. Moreover, such hydrolysis also frequently is accompanied by a tendency to blocking, i.e., a tendency for the ordinarily granular phosphite material to congeal into a single solid block.

Many attempts have been made to solve this problem. Additives such as triisopropanolamine have been found to impart a significant hydrolytic stability to dialkyl pentaerythritol diphosphites. The above-noted process for preparing relatively pure spiro isomer diminishes the problem. The phosphite can be stored in moisture-proof containers such as polyethylene bags until just before use. All of these have been very helpful, but they have not eliminated the problem, nor the desirability of a solution to the problem.

SUMMARY OF THE INVENTION

The invention here is an encapsulated organic phosphite composition stable to hydrolysis under ordinary conditions of storage comprising a dialkyl pentaerythritol diphosphite wherein the alkyl groups each contain 10-20 carbon atoms, coated with a petroleum or ester wax. The dialkyl pentaerythritol diphosphite preferably is one wherein the alkyl groups each are stearyl groups, and an especially preferred embodiment is the spiro isomer of distearyl pentaerythritol diphosphite. This preference is based, of course, on the inherent, excellent hydrolytic stability of this isomer. Another preferred embodiment is a mixture of approximately equal proportions of spiro and caged isomers, a preference based on its ready availability and generally acceptable hydrolytic stability. It is conveniently prepared, as noted above, by the reaction of stearyl alcohol and diphenyl pentaerythritol diphosphite.

The petroleum and ester waxes contemplated within the scope of the invention include paraffin waxes, beeswax, shellac wax, woolwax, spermaceti, carnauba wax, palm wax, candelilla wax, flax wax, sugarcane wax, Japan wax, bayberry wax, myrtle wax, hydrogenated jojoba oil, esterified montanic acid, peat wax, montan wax, ozocerite and cetyl stearate. Suitable waxes are characterized by melting points within the range of from about 35° C. to about 100° C. A preferred wax is a glycerol ester of montanic acid. It has a melting point slightly above 70° C.

A process by which these encapsulated dialkyl pentaerythritol diphosphites may be prepared comprises preparing a homogeneous liquid mixture of a wax in a solvent in which the diphosphite is relatively insoluble, preparing a second mixture of said liquid mixture and the diphosphite, agitating this second mixture, and removing the solvent from the second mixture by evaporation. The terminology "homogeneous liquid mixture" encompasses both solutions as a wax in a solvent as well as mixtures which are not true solutions, but which nevertheless are homogeneous, e.g., fluid colloidal systems (sols) and the like.

The above homogeneous liquid mixture of wax and solvent generally will contain from about 2% to about 30% by weight of wax, based on the weight of the mixture. More than this usually is difficult to work with because of the requirement for homogeneity and less involves the use of an unduly large amount of solvent. Sometimes it is desirable to dissolve the wax at slightly elevated temperatures to facilitate homogenization and then to lower the temperature for the coating step.

The solvent must, as indicated, be one which will permit the development of a homogeneous mixture with the wax, but will not dissolve the dialkyl pentaerythritol diphosphite. Suitable solvents include hexane, heptane, octane, acetone, methanol and the like. Preferably, the solvent is relatively low boiling, i.e., below 100° C., so as to facilitate its convenient removal from the encapsulated phosphite.

The ratio of wax to phosphite should be at least about 1:100, i.e., at least about 1 part of wax to 100 parts (1%) of phosphite. The use of less than this amount of wax risks the possibility that the phosphite will be incompletely encapsulated. More than this can be used virtually without limit, since the excess wax will serve as a desired lubricant in the polymer composition in which the encapsulated phosphite is used.

An illustrative encapsulation procedure is shown in the following example.

EXAMPLE

A mixture of 12.5 grams of wax (a triglyceride of montanic acid) and 50 ml. (34.0 grams) of heptane is warmed slowly, with stirring, to 70° C., by which time it has become clear, then allowed to cool, with continued stirring until it is slightly turbid, whereupon it is poured onto 25.0 grams of distearyl pentaerythritol diphosphite (an approximately 50—50 mixture of spiro and caged isomers). The resulting mixture is agitated until the solid diphosphite is thoroughly wetted and then evaporated to dryness at a temperature below 40° C. and at reduced pressure. The residue is the desired encapsulated product.

The effectiveness of the encapsulated phosphites herein is shown by the data in Table I. That data is obtained from a Dynamic Mill Stability Test wherein the test sample is processed on a two-roll mill (150 mm. circumference × 400 mm. wide; 21/21 rpm) at 200° C. The time until development of charring is noted. Each test sample contains the following ingredients:

| Ingredients | Parts |
| --- | --- |
| Polyvinyl chloride | 100 |
| Methyl methacrylate/butadiene/styrene graft copolymer | 10 |
| Poly(alkyl methacrylate) | 0.5 |
| Calcium stearate | 0.05 |
| Zinc octoate (12%) | 0.15 |
| Epoxidized soya oil | 3.0 |
| Glycerol triester of montanic acid | 1.0 |

In addition: test sample A contains 0.4 part of fresh distearyl pentaerythritol diphosphite; test sample B contains 0.54 part* of the encapsulated distearyl phosphorodithioate prepared as in the above Example and which has aged for 28 days in air (30–50% relative humidity) at room temperature; and test sample C contains 0.4 part of distearyl pentaerythritol diphosphite which has aged for 28 days in air (30–50% relative humidity) at room temperature. The term "fresh distearyl pentaerythritol diphosphite" refers to such phosphite which has been stored in a moisture-proof container.

*containing 0.4 part of distearyl pentaerythritol diphosphite.

TABLE I

| Polymer Composition | Results |
| --- | --- |
| A | Clear, water-white for 6 minutes, slightly yellow at 10 minutes, chars at 10.5 minutes. |
| B | Clear, water-white for 6 minutes, very slightly yellow at 10.5 minutes, chars at 11.5 minutes. |
| C | Slightly yellow at 3.0 minutes, medium yellow at 6 minutes, dark yellow at 11.5 minutes. |
| D | Slightly yellow at 6 minutes, chars at 6.5 minutes. |

It will be seen that the encapsulated phosphite B performs about as well as a heat stabilizer as does the fresh phosphite A. The aged (not encapsulated) phosphite C performs unsatisfactorily and is inferior both to A and B. The composition containing no phosphite clearly is the least stable.

Additional evidence of the improved stabilizing properties of the encapsulated phosphites herein is shown in Table II where A, B, C and D refer to the same polymer compositions as those in Table I. The test results of Table II are obtained from an Oven Stability Test wherein test strips are heated in an oven at 200° C. and removed gradually from the oven so that the various portions of the sample are heated at this temperature for different periods of time.

TABLE II

| Polymer Composition | Results |
| --- | --- |
| A | Clear, water-white for 15 minutes, then chars suddenly. |
| B | Clear, water-white for 10 minutes, gradually changes to a medium yellow throughout a 21-minute period, then chars suddenly. |
| C | Gradually becomes dark yellow throughout a 21-minutes period, then chars suddenly. |
| D | Clear, water-white for 11 minutes, then chars suddenly. |

The results demonstrate, again, the efficacy as a heat stabilizer of the encapsulated distearyl pentaerythritol diphosphite. Test sample B, illustrative of the invention, clearly is superior to test sample C which is illustrative of the prior state of the art. The latter's darker color throughout the test period renders it much less acceptable than the polymer composition represented by test sample B.

We claim:

1. An encapsulated organic phosphite composition stable to hydrolysis under ordinary conditions of storage comprising a dialkyl pentaerythritol diphosphite wherein the alkyl groups each contain 10–20 carbon atoms, coated with a glycerol ester of montanic acid.

2. The encapsulated organic phosphite composition of claim 1 wherein the alkyl groups are each stearyl groups.

3. The encapsulated organic phosphite composition of claim 1 wherein the dialkyl pentaerythritol diphosphite is a mixture of spiro and caged isomers.

4. The encapsulated organic phosphite composition of claim 3 wherein the spiro isomer comprises at least about 80% of said mixture.

5. The encapsulated organic phosphite composition of claim 1 wherein the dialkyl pentaerythritol diphosphite is substantially pure spiro isomer.

6. A process for encapsulating a dialkyl pentaerythritol diphosphite wherein the alkyl groups each contain 10–20 carbon atoms comprising preparing a homogeneous liquid mixture of a glycerol ester of montanic acid in a solvent in which the diphosphite is relatively insoluble, preparing a second mixture of said liquid mixture and the diphosphite agitating this second mixture, and removing the solvent from the second mixture by evaporation.

7. The process of claim 6 wherein the alkyl groups of the dialkyl pentaerythritol diphosphite are stearyl groups.

8. The process of claim 6 wherein the solvent is an aliphatic hydrocarbon having a boiling point of from about 50° C. to about 100° C.

9. The process of claim 6 wherein the temperature of the second mixture is below the melting point of the dialkyl pentaerythritol diphosphite.

* * * * *